Patented July 24, 1928.

1,678,623

UNITED STATES PATENT OFFICE.

HENRY A. AARONSON, OF NEW YORK, N. Y.

METHOD FOR PREPARING PENTAERYTHRITE.

No Drawing.    Application filed November 8, 1923.    Serial No. 673,441.

(GRANTED UNDER THE PROVISIONS OF THE ACT OF MARCH 3, 1883, 22 STAT. L., 625, AS AMENDED APRIL 30, 1928.)

The invention described herein may be manufactured and used by or for the Government for governmental purposes, without the payment to me of any royalty thereon.

The subject of the present invention is a method for preparing pentaerythrite.

Pentaerythrite—the structural formula of which is $$HO.H_2C-\underset{\underset{CH_2.OH}{|}}{\overset{\overset{CH_2.OH}{|}}{C}}-CH_2OH$$

is used as a starting material in the preparation of pentaerythrite tetranitrate, at the present time an important military explosive, and being a tetrahydroxy alcohol it forms in addition to the tetranitrate a whole series of other derivatives, some of which, it has been found, may be combined with the pentaerythrite tetranitrate to produce a colloided or plastic composition having excellent explosive qualities and which is readily workable so as to be easily loaded into the desired charges. The preparation of pentaerythrite is, therefore, an important process and considerable experimentation has been conducted to determine the best method for manufacturing this compound.

The primary object of my invention is the establishment of a method by which a high production of pentaerythrite may be obtained from a minimum quantity of the proper starting materials.

This object is attained by a proper ratio of the reagents used, whereby the volume of water to be evaporated is greatly reduced; the addition of lime, whereby the formation of undesirable condensation products is reduced; and maintaining the temperature below a maximum limit, whereby the reaction is made to take place in a short time without producing caramelization.

With the foregoing and other objects in view, my invention resides in the novel combination of ingredients and in the details of preparation hereinafter described and claimed, it being understood that changes in the precise embodiment of the invention herein disclosed may be made without departing from the spirit of the invention.

In carrying out the method which is the subject of this invention, the reagents, acetaldehyde and formaldehyde are mixed, preferably, in the proportions of one molecule which is equivalent to 44.032 grams of acetaldehyde to five molecules which is equivalent to 150.08 grams of formaldehyde. To this mixture is added a sufficient amount of water, in practice, not to exceed a thousand grams or 55.5 molecules and the whole is placed in a vessel fitted with heating and cooling coils and with an efficient stirring device and the whole mixture well stirred.

Acetaldehyde, formaldehyde and water combine to form pentaerythrite according to the following equation:

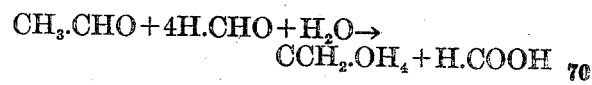
$$CH_3.CHO+4H.CHO+H_2O \rightarrow \\ CCH_2.OH_4+H.COOH$$

To the mixture is gradually added finely powdered lime or any other substance which will evolve heat and the addition of lime is continued until the temperature of the whole mixture measures about 60° C. By gradually adding small quantities of lime, the temperature may be maintained at about this point. The addition of the lime is continued until 0.6 of a molecule, equivalent to 33.64 grams, has been added. The stirring of the mixture with addition of the necessary amount of lime, is carried on for a suitable period which, in practice, has been found to be about two hours, the temperature being maintained, at all times, during this step in the process below 65° C. by means of the coils with which the mixing apparatus is equipped.

At the completion of the reaction under heat, the reaction mixture is allowed to cool and the calcium or other heat evolving substance removed by combination with a material which will form with the calcium, a precipitate, which may be filtered off, or a liquid having a different specific gravity from the rest of the mixture which may be drawn off or removed by a centrifuge or similar device. In practice, the lime has been removed, preferably, by precipitating with sulphuric acid, filtering off the calcium sulphate thus formed and removing any residual calcium by the addition of oxalic acid.

The solution of pentaerythrite prepared in the manner described above should be clear lemon yellow in color. This liquid is, preferably, vaporized under vacuum to a thick mud and well washed, in practice, with portions of cold alcohol of preferably 95% strength. The alcoholic washings may be sucked off on a filter bed by suction. The pentaerythrite is then dried and may, if desired, be finely pulverized.

In this condition the pentaerythrite is suitable as a starting material for the preparation of the pentaerythritetetranitrate or for the manufacture of the other derivatives which may be combined with pentaerythritetetranitrate to form plastic explosives.

The alcoholic washings obtained in the purification of the pentaerythrite may be concentrated to recover the bulk of the alcohol and the residue will be found to yield more pentaerythrite. It will thus be seen that the method described is most efficient in that there is little waste of materials. The pentaerythrite obtained from the alcoholic washings should be almost pure white in color.

When pentaerythrite is manufactured from formaldehyde and acetaldehyde mixed in the proportions named, it has been found that the volume of water to be vaporized has been decreased materially over any other method heretofore devised. Consequently, the pentaerythrite may be prepared with a minimum of heat and in a considerably shorter time than by the processes heretofore used.

With the method described, moreover, the lime may be added gradually and in such proportions as to reduce the formation of undesirable condensation products. This achievement is a great advance in the production of the desired material, namely pentaerythrite. Furthermore, with my process, the temperature may be controlled below a maximum limit so that the reaction is made to take place in a short time without producing caramelization.

Pentaerythrite, moreover, prepared by the method described will be pure and lend itself more readily to the combination with other materials than when prepared by any other known process.

Having thus described my invention, what I claim is:

1. The method of preparing pentaerythrite which includes mixing about 44 grams of acetaldehyde with about 150 grams of formaldehyde, and not to exceed 1,000 grams of water, gradually adding lime while stirring until the temperature of 60° C. has been attained, continuing the gradual addition of lime to maintain such temperature until about 33 grams is added, continuing the stirring for a period of two hours while maintaining a temperature of approximately 60° C. and below 65° C., cooling the mixture, precipitating the lime with sulphuric acid, filtering off the calcium sulphate, removing the remaining lime with oxalic acid, evaporating the remaining solution under vacuum, washing and drying the residue, and then pulverizing the same.

2. The method of preparing pentaerythrite which includes mixing about 44 grams of acetaldehyde with about 150 grams of formaldehyde and not to exceed 1,000 grams of water, gradually adding lime while stirring, raising the temperature of the mixture to 60° C., continuing to gradually add lime to maintain such a temperature until about 33 grams have been added, continuing the stirring for a period of two hours while maintaining a temperature of approximately 60° C., cooling the mixture, removing the lime by precipitation, evaporating the remaining solution, washing and drying the residue, and then pulverizing the same.

3. The method of preparing pentaerythrite which includes mixing acetaldehyde and formaldehyde with water, gradually adding lime while stirring until a temperature of 60° C. has been attained, then gradually adding lime to maintain such a temperature, continuing the stirring for a period of two hours and maintaining a temperature of approximately 60° C., cooling the mixture, precipitating the lime, evaporating the remaining solution, washing and drying the residue and then pulverizing the same.

4. The method of preparing pentaerythrite which includes mixing acetaldehyde and formaldehyde with water, adding lime gradually while stirring the mixture, raising the temperature to approximately 60° C., and not to exceed 65° C., maintaining such temperature while stirring the mixture for a period of approximately two hours, then recovering the pentaerythrite formed.

HENRY A. AARONSON.